United States Patent

Kawasaki et al.

[11] Patent Number: 5,097,943
[45] Date of Patent: Mar. 24, 1992

[54] BOBBIN TRANSFER APPARTAUS IN SPINNING PROCESSES

[75] Inventors: Yoshio Kawasaki; Tatsutake Horibe, both of Fujieda, Japan

[73] Assignee: Nisshinbo Industries, Inc., Tokyo, Japan

[21] Appl. No.: 565,193

[22] Filed: Aug. 8, 1990

Related U.S. Application Data

[63] Continuation of Ser. No. 206,814, Jun. 15, 1988, abandoned.

[51] Int. Cl.$^5$ .............................................. B65G 15/00
[52] U.S. Cl. ........................... 198/836.1; 242/35.5 A; 198/841; 198/417
[58] Field of Search ............... 198/465.1, 417, 803.01, 198/803.12, 836.1, 841, 804, 690.1; 242/35.5 A, 46, 46.2, 46.3

[56] References Cited

U.S. PATENT DOCUMENTS

| | | | |
|---|---|---|---|
| 1,786,343 | 12/1930 | Griffith | 198/417 |
| 3,107,001 | 10/1963 | Kotraba | 198/803.01 X |
| 3,338,374 | 8/1967 | Dudley | 198/690.1 |
| 3,756,586 | 9/1973 | Craft | 198/417 X |
| 3,788,457 | 1/1974 | Valentino, Jr. | 198/836 |
| 4,230,223 | 10/1980 | Flanik | 198/836 X |
| 4,469,229 | 9/1984 | Cronan | 198/417 X |
| 4,479,574 | 10/1984 | Julius et al. | 198/841 X |
| 4,732,268 | 3/1988 | Sjostrand | 198/836 X |
| 4,807,412 | 2/1989 | Araki et al. | 198/803.01 X |

FOREIGN PATENT DOCUMENTS

| | | | |
|---|---|---|---|
| 61-64679 | 4/1986 | Japan . | |
| 1238664 | 10/1986 | Japan | 242/35.5 A |
| 62-57947 | 3/1987 | Japan . | |
| 2180882 | 8/1987 | Japan | 242/35.5 A |
| 2191304 | 8/1987 | Japan | 198/803.01 |
| 0116436 | 5/1988 | Japan | 198/417 |

Primary Examiner—Robert P. Olszewski
Assistant Examiner—James R. Bidwell
Attorney, Agent, or Firm—Young & Thompson

[57] ABSTRACT

An apparatus transfers bobbins mounted on peg trays by way of an endless transmission belt trained about and driven by guide pulleys in a required passage. The apparatus comprises two elongated guides slidably contacting the peg trays and elastically embracing the peg trays between the elongated guides and the endless transmission belt. The endless transmission belt and the two elongated guides are twisted at required positions to twist a passageway of the peg trays formed by the transmission belt and the elongated guides. Therefore, the bobbins are able to pass through their passageway without interfering with each other.

11 Claims, 9 Drawing Sheets

FIG_4
FIG_5
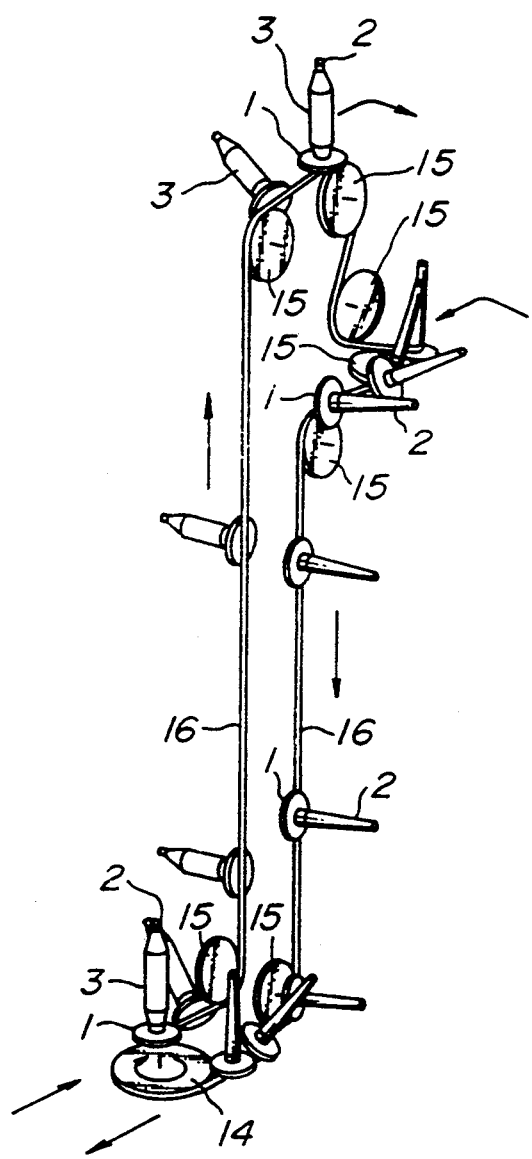
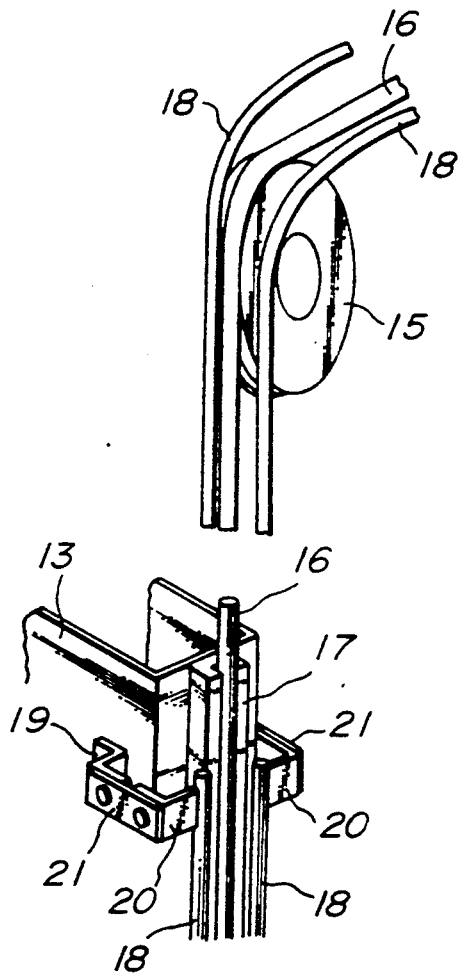

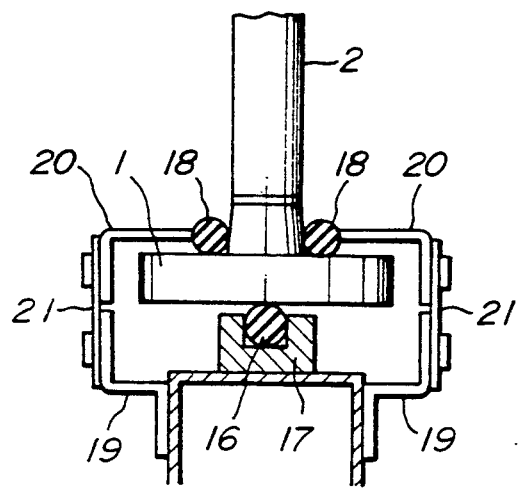
FIG_6a
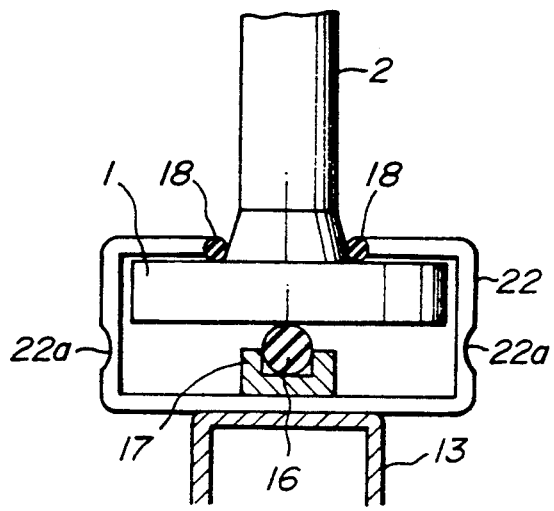
FIG_6b
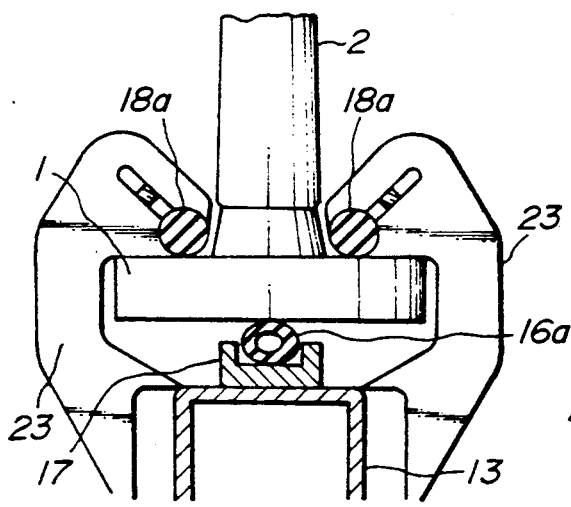
FIG_6c
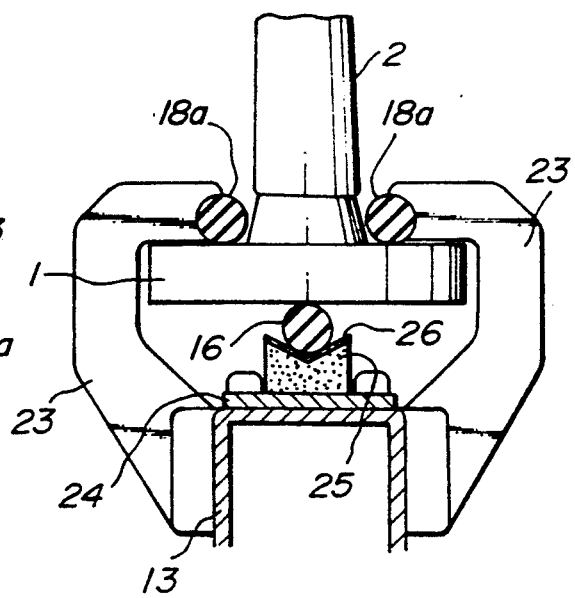
FIG_6d

FIG_6e
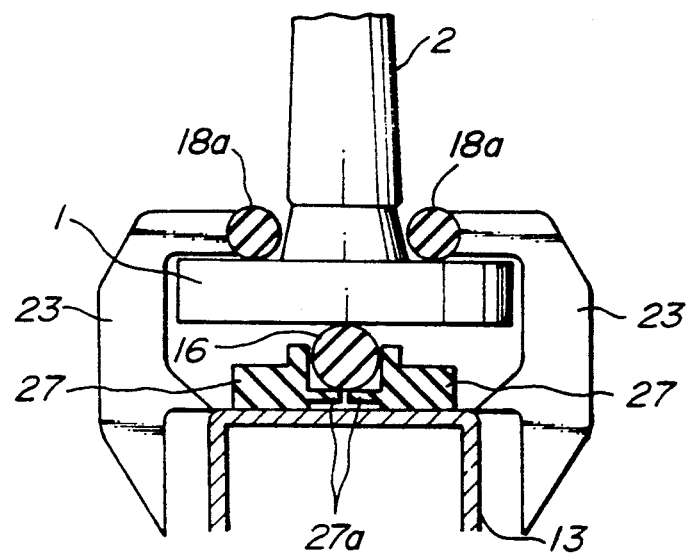
FIG_7a      FIG_7b      FIG_7c
      

FIG_8
FIG_9
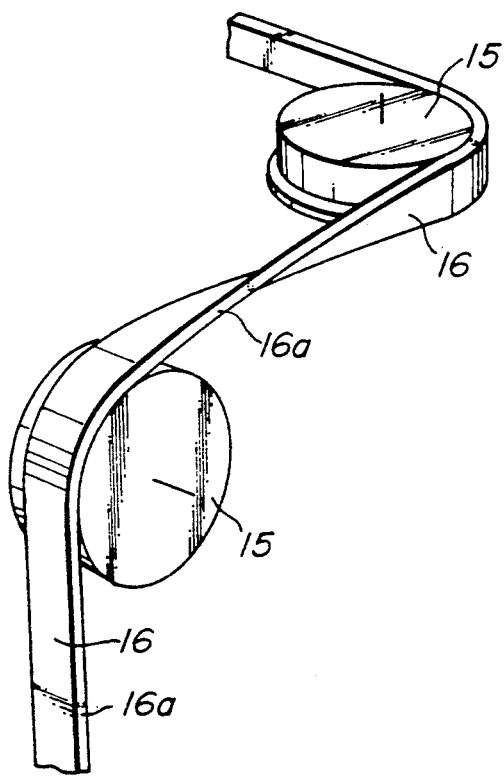
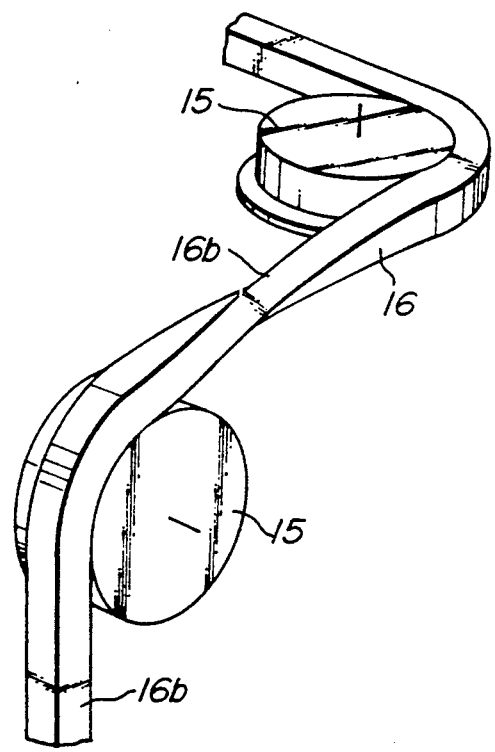

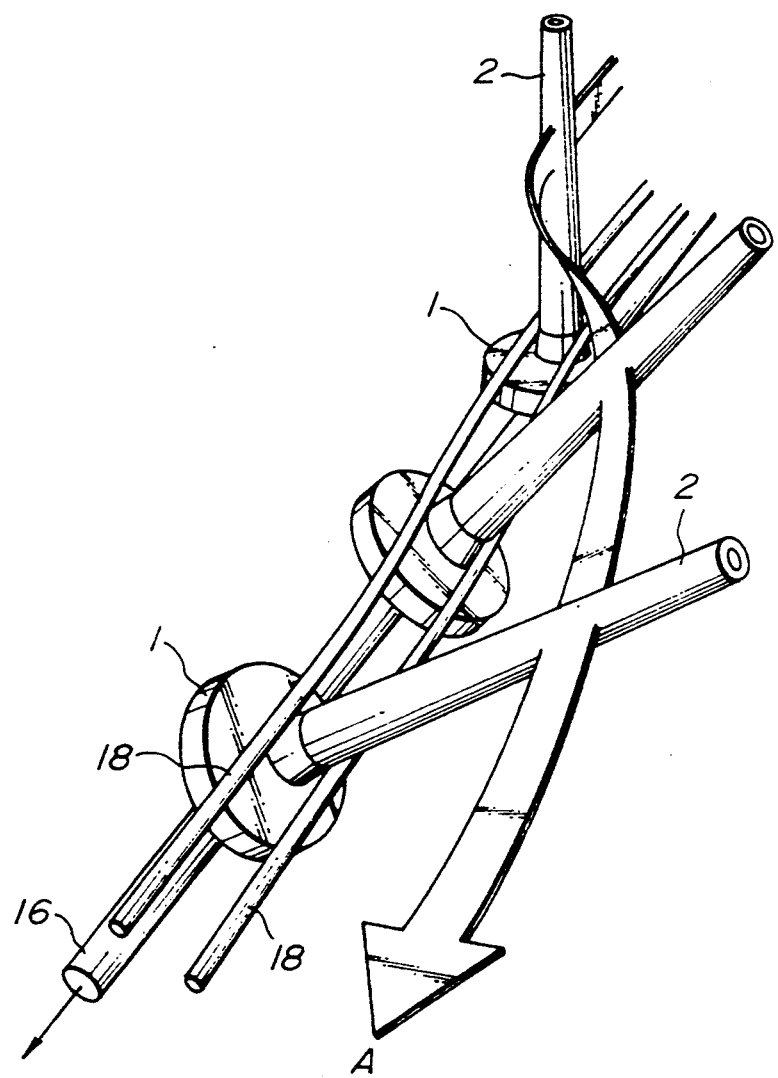
FIG_10

FIG_11
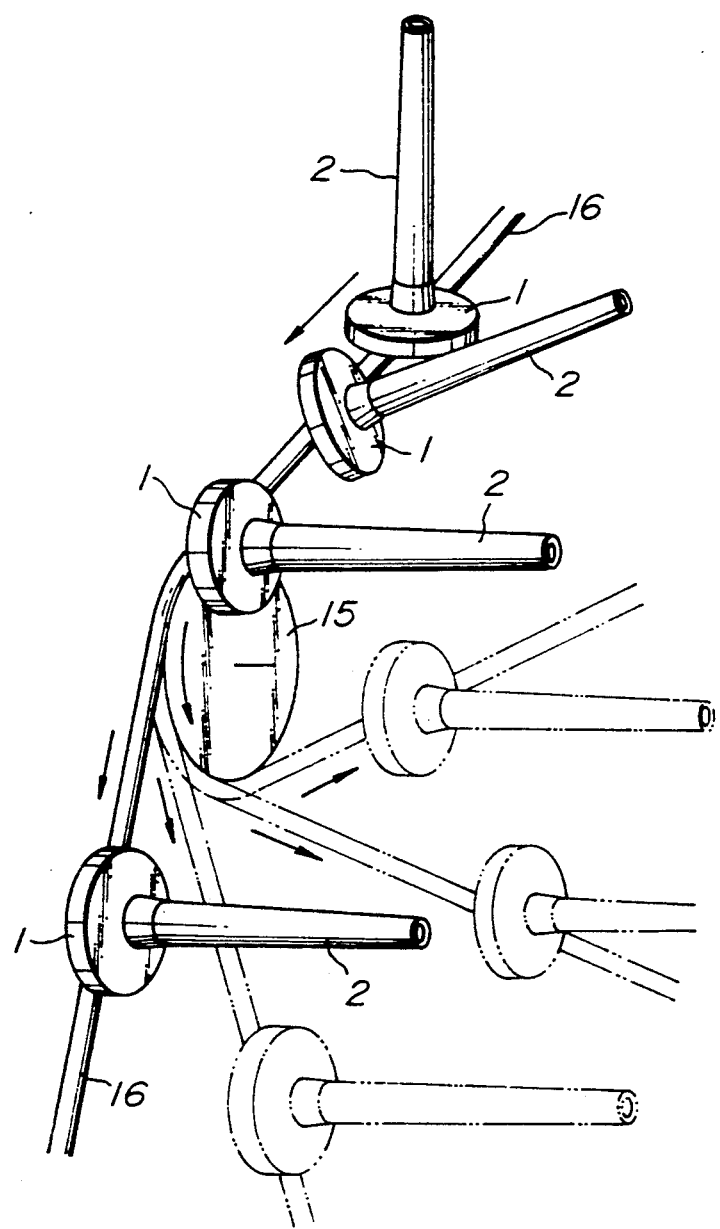

FIG_12a 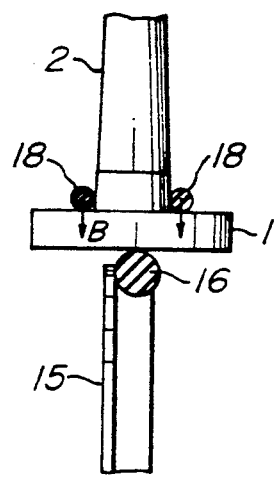
FIG_12b 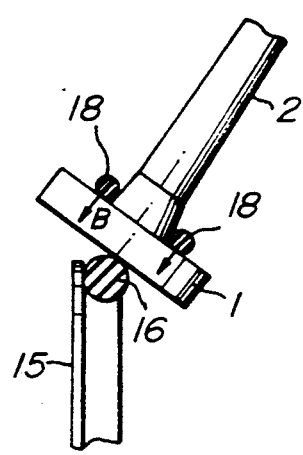
FIG_12c 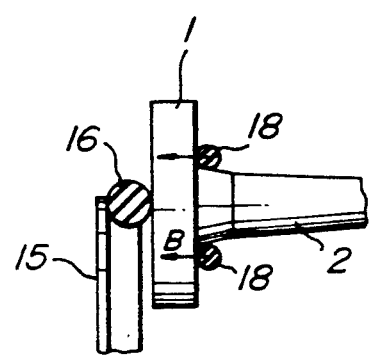
FIG_13a 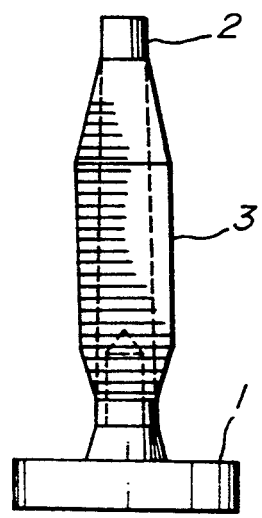
FIG_13b 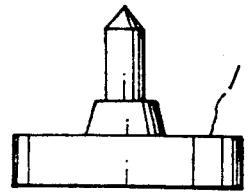

BOBBIN TRANSFER APPARTAUS IN SPINNING PROCESSES

This application is a continuation of application Ser. No. 206,814, filed June 15, 1988, now abandoned

BACKGROUND OF THE INVENTION

This invention relates to an apparatus for transferring cops or bobbins mounted on peg trays in spinning processes.

One example of a bobbin mounted on a peg tray used in spinning processes is shown in FIGS. 13a and 13b. In the drawing, a peg tray 1 in the form of a disc upstandingly supports a bobbin 2 together with a cop 3 thereabout.

One example of a hitherto used vertical transfer apparatus for bobbins is shown in FIGS. 1 and 2. This apparatus comprises a base frame 4 arranged on a floor 5, and a conveyor frame 6 upstandingly supported by the base frame 4 and consisting of forward and backward running portions integrally formed as shown in FIG. 2. The conveyor frame 6 includes a lower curved portion 6a, an intermediate vertical portion 6b and an upper curved portion 6c. In the conveyor frame 6, there is provided an endless transmission belt 7 (FIG. 2) consisting of a wide base belt 7a guided by the conveyor frame 6 and a rough top belt 7b arranged along a longitudinal center line of the base belt 7a. The endless transmission belt 7 extends around end rollers 8 respectively arranged at both ends of the conveyor frame 6 where the transmission belt 7 turns its running direction, a driving roller 9 provided in the base frame 4 for driving the transmission belt 7, a guide roller 10 and a tension roller 11 for taking slack of the belt 7.

When the endless transmission belt 7 is driven by rotation of the driving roller 9, the bobbins 2 together with peg trays 1 are raised or lowered along the conveyor frame 6 with the aid of frictional connection between the transmission belt 7 and the peg trays 1.

With such a hitherto used apparatus, however, the cops 3 of the bobbins 2 interfere with each other in the event that a radius R of curvature of the lower curved portion 6a is somewhat small. Therefore, the radius R of curvature of the lower curved portion require to be larger than that shown in FIG. 1. Accordingly, such a transfer apparatus needs a large space for arranging the apparatus, while a layout between conveyors is unavoidably restricted so that the apparatus is disadvantageous in economical viewpoint.

Moreover, as the vertical transfer apparatus of this type utilizes the elasticity of the base belt 7a and the frictional force of the rough top belt 7b, the apparatus often becomes impossible to transfer bobbins due to slight wear of the belts and is prone to trouble when fly waste has accumulated in the conveyor frame 6.

SUMMARY OF THE INVENTION

It is an object of the invention to provide an improved apparatus for transferring bobbins mounted on peg trays in spinning processes, which eliminates all the disadvantages of the prior art.

In order to achieve this object, in an apparatus for transferring bobbins mounted on peg trays by means of an endless transmission belt trained about and driven by guide pulleys in a required passage, the apparatus according to the invention comprises two elongated guides slidably contacting said peg trays and elastically embracing said peg trays between the elongated guides and said endless transmission belt, and said endless transmission belt and said two elongated guides being twisted at required positions to twist a passageway of said peg trays formed by the transmission belt and the elongated guides, thereby permitting the bobbins to pass through their passageway without interfering with each other.

As the passageway of the peg trays formed by the twisted at required positions, there is no risk of bobbins interfering with each other even if radii of curvatures of a conveyor frame are much smaller than those of the prior art. Therefore, the apparatus according to the invention requires only a smaller space than those of the prior art, and the lay out between conveyors can be easily effected to reduce the cost.

In the apparatus according to the invention, the peg trays are elastically embraced between the endless transmission belt and the elongated guides. Therefore, even if the transmission belt is slightly worn, there is no risk of the apparatus to become impossible to transfer the peg trays as with those of the prior art. Moreover, the passageway of the peg trays includes much spaces in comparison with those of the prior art so that troubles due to accumulation of fly waste scarcely occur.

Furthermore, as the peg trays are elastically held, even if there are somewhat irregularities in dimensions of the peg trays, such irregularities are sufficiently absorbed or compensated. If the urging forces for the peg trays are suitably selected, it is possible to accumulate continuously transferred bobbins.

In order that the invention may be more clearly understood, preferred embodiments will be described, by way of example, with reference to the accompanying drawings.

BRIEF DESCRIPTION OF THE DRAWINGS

FIG. 4 is a perspective view of the conveyor of the apparatus shown in FIG. 3;

FIG. 5 is a partial perspective view of the conveyor shown in FIG. 4;

FIG. 6a is a sectional view of a support of elastic guides in the conveyor shown in FIG. 5;

FIGS. 6b, 6c, 6d and 6e are sectional views of modifications of the support shown in FIG. 6a;

FIGS. 7a, 7b and 7c are sectional views illustrating cross-sections of the transmission belt used in the apparatus according to the invention;

FIGS. 8 and 9 are partial perspective views illustrating extending conditions of transmission belts;

FIG. 10 is a perspective view showing a twisted peg tray passageway;

FIG. 11 is a perspective view illustrating bobbins at curved portion of the transmission belt;

FIGS. 12a, 12b and 12c are explanatory views illustrating progressively tilting bobbins; and FIGS. 13a and 13b illustrate a bobbin used in the present invention and a tray for the bobbin, respectively.

DESCRIPTION OF THE PREFERRED EMBODIMENTS

Figure 1:
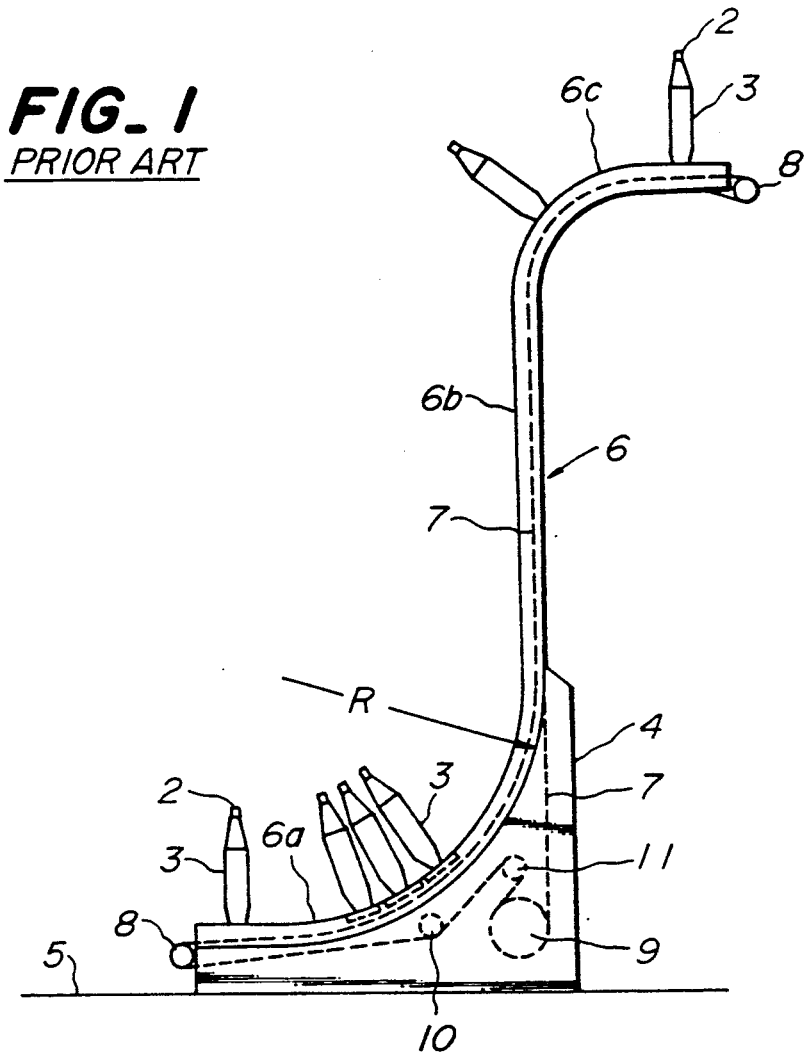
FIG. 1 is a front elevation of a transfer apparatus for bobbins of the prior art.
Figure 2:
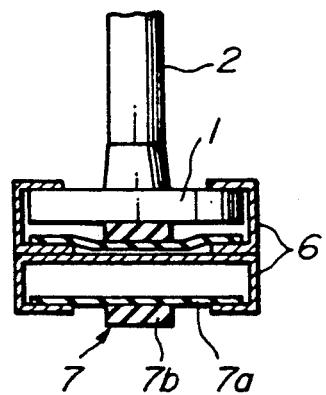
FIG. 2 is a sectional view of a conveyor frame of the apparatus shown in FIG. 1.

Various embodiment of the invention are illustrated in FIGS. 3 to 12a, 12b and 12c, wherein like components are designated by the same reference numerals as those in FIGS. 1 and 2.

Figure 3:
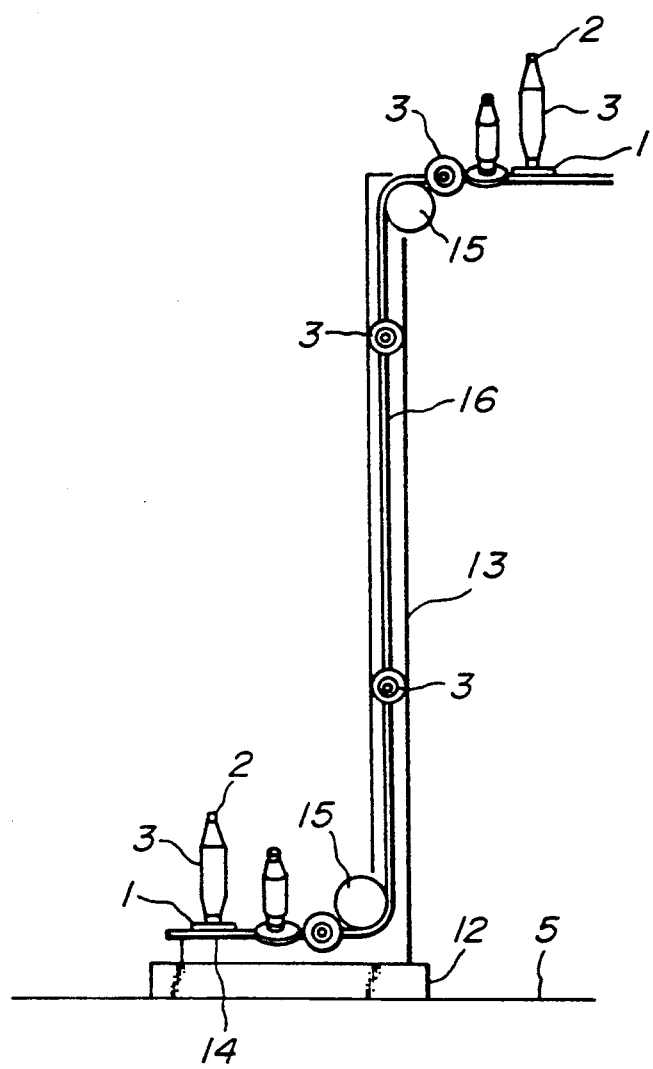
FIG. 3 is a front elevation of an apparatus according to the invention.

According to the invention, on a floor 5 is arranged a base frame 12 (FIG. 3) on which a conveyor frame 13 is upstandingly provided. A driving pulley 14 is provided on a bottom of the conveyor frame 13 so as to be rotatively driven, and a number of guide pulleys 15 are arranged at required positions on the conveyor frame 13 as shown in FIGS. 3 and 4. An endless transmission belt 16 extends about the driving pulley 14 and guide pulleys 15. According to the invention, moreover, the conveyor frame 13 is provided with grooved belt guides 17 as shown in FIGS. 5 and 6a for guiding straight running portions of the endless transmission belt 16. A bottom surface of each of peg trays 1 is brought into contact with the endless transmission belt 16 and an upper surface of the peg tray is resiliently urged against the endless transmission belt 16 by means of two elastic guides 18 which are arranged along the endless transmission belt 16 so as to embrace the bobbins 2 upstanding from the peg trays 1. Reference numeral 19 denotes brackets provided on side surfaces of the conveyor frame 13 and connected by leaf springs 21 to brackets 20 fixed to the elastic guides 18. With this arrangement, the elastic guides 18 urge the upper surface of the peg trays 1 with the aid of spring forces of the leaf springs 21.

In a modification shown in FIG. 6b, instead of the leaf springs 21, a C-shaped channel frame 22 is made of polycarbonate by extruding and is formed in side surfaces with shallow grooves 22a to give the frame 22 resilient property serving as the leaf springs 21. The elastic guides 18 are supported by opened edges of the C-shaped channel frame 22.

In FIG. 6c, a transmission belt 16a is made hollow to give it large elasticity, and the conveyor frame 13 is provided on both sides with guide brackets 23 having fixed guides 18a at ends thereof.

In FIG. 6d, on the conveyor frame 13 is mounted a seat plate 24 on which is provided an elastic member 25 such as foamed rubber having a V-shaped groove, and an elastic sheet 26 such as Teflon (trade name) sheet having a small frictional resistance is attached to surfaces of the V-shaped groove to elastically support the transmission belt 16.

In FIG. 6e, two belt guides 27 made of an elastomer having leaf springlike projections 27a are provided on the conveyor frame 13 with the leaf springlike projections 27a being in opposition to each other to resiliently support the transmission belt 16 by the projections 27a.

Moreover, the passageway of the peg trays 1 formed by the transmission belt 16 (16a), elastic guides or fixed guides 18a is arranged such that a longitudinal axis of the passageway is twisted at desired locations.

In other words, as shown in FIG. 10, one transmission belt 16 and two elastic guides 18 cause the passageway of the peg trays 1 to twist so that the bobbins 2 integral with the peg trays 1 are moved as shown by an arrow A in FIG. 10.

According to the invention, therefore, the bobbins 2 upstanding on the transmission belt 16 are progressively tilted onto the side or in lateral directions as they approach the guide pulley 15, so that the bobbins 2 are substantially horizontal when they pass by the guide pulley, thereby securely preventing the bobbins 2 or cops 3 from interfering with each other as shown in FIG. 11.

FIGS. 12a, 12b and 12c are explanatory views of progressive tilting processes of the bobbins 2. As shown in the drawings, the guide pulley 15 is so constructed that its flange on the tilting side of the bobbins 2 does not obstruct the tilting of the bobbins 2. Arrows B illustrate spring forces of the elastic guides 18 urging the peg tray 1. As these spring forces B always direct to the transmission belt 16, there is no risk of the belt 16 jumping out of the groove of the guide pulley 15.

With the above construction, the bobbin transfer apparatus according to the invention enables the passageway of the peg trays 1 to be curved with very small radius of curvature and prevents bobbins 2 or cops 3 from interfering with each other in a reliable manner.

The transmission belt 16 has been explained as that made of urethane rubber having a circular cross-section in the above embodiments, the belt 16 may have other cross-section as shown in FIGS. 7a, 7b and 7c. FIG. 7a illustrates a rectangular cross-section in which case, the bottom surfaces of the peg trays 1 are forced against edges 16a of the belt 16 as shown in FIG. 8.

FIG. 7b illustrates a square cross-section in which case, one side surface 16b of the belt 16 may be forced to the bottom surfaces of the peg trays 1 as shown in FIG. 9.

Moreover, FIG. 7c shows a polygonal cross-section of the transmission belt 16.

As can be seen from the above explanation, the passageway of peg trays 1 formed by the transmission belt 16 (16a) and the elastic guide 18 or the fixed guide 18a is arranged so as to be twisted at desired locations according to the invention. Therefore, the bobbins do not interfere with each other, even if a radius of curvature of a curved portion whose center of curvature is on the side of the bobbins is much smaller than those of the prior art. Accordingly, the bobbin transfer apparatus according to the invention requires only a small space in which the apparatus is settled in comparison with those of the prior art. Layout between the conveyors can be easily achieved so that required cost can be reduced.

According to the invention, moreover, the endless transmission belt 16 in contact with the bottom surface of the peg trays 1 to achieve the frictional transmission is arranged and driven along a desired passageway through the grooved belt guide 17 and the guide pulley 15. The two guides 18 (18a) are arranged along the transmission belt 16 (16a) and slidably contacting upper surfaces of the peg trays 1 so that the peg trays 1 are elastically embraced between the guides and the transmission belt so as to be elastically compressed by the transmission belt. Therefore, even if the transmission belts 16 is slightly worn, the apparatus can continue to transfer the peg trays without any trouble. Slight wear would often make the apparatuses of the prior art impossible to transfer the peg trays. Further, the passageway of the peg trays 1 includes much spaces in comparison with those of the prior art so that troubles due to accumulation of fly waste hardly occur.

Moreover, as the peg trays 1 are elastically supported, even if there are somewhat irregularities in dimension of the peg trays 1, such irregularities are sufficiently absorbed or compensated. If the urging forces for the peg trays are suitably selected, it is possible to accumulate the bobbins being continuously transferred.

It is further understood by those skilled in the art that the foregoing description is that of preferred embodiments of the disclosed apparatuses and that various changes and modifications may be made in the invention without departing from the spirit and scope thereof.

What is claimed is:

1. In an apparatus for transferring bobbins mounted on peg trays by means of an endless transmission belt trained about and driven by guide pulleys in a required passage, the improvement comprising two elongated guides slidably contacting said peg trays and elastically embracing said peg trays between the elongated guides and said endless transmission belt, grooved belt guides means by which said transmission belt is guided, said two elongated guides being twisted at required positions to twist a passage of said peg trays formed by the transmission belt and the elongated guides, said guide pulleys including two immediately adjacent pulleys having axes disposed at substantially 90° to each other, said endless transmission belt being wrapped substantially 90° about each of said two pulleys and said elongated guides following said belt about said two immediately adjacent pulleys, thereby permitting the bobbins to swing about said two pulleys so as to pass through their passageway without interfering with each other.

2. An apparatus for transferring bobbins as set forth in claim 1, wherein a conveyor frame for said endless transmission belt is provided on side surfaces with brackets and leaf springs connecting said brackets to brackets supporting said elongated guides, respectively.

3. An apparatus for transferring bobbins as set forth in claim 1, wherein a conveyor frame for said endless transmission belt is provided on both sides with guide brackets supporting said elongated guides at ends thereof, respectively, and said endless transmission belt is made hollow to give it large elasticity.

4. An apparatus for transferring bobbins as set forth in claim 1, wherein a conveyor frame for said endless transmission belt is provided on both sides with guide brackets supporting said elongated guides at ends thereof, respectively, and said endless transmission belt is supported in a V-shaped groove of an elastic member and an elastic sheet having a small frictional resistance attached to surfaces of the V-shaped groove of the elastic member.

5. An apparatus for transferring bobbins as set forth in claim 1, wherein said endless transmission belt is selected from a group consisting of those having circular, rectangular, square and polygonal cross-sections.

6. An apparatus for transferring bobbins as set in claim 1, wherein said endless transmission belt and said elongated guides are twisted so that said bobbins upstanding on said endless transmission belt are progressively tilted into lateral directions as they approach one of said guide pulleys and said bobbins are substantially horizontal when they pass by the guide pulley.

7. An apparatus for transferring bobbins as set forth in claim 1, and brackets on which said elongated guides are supported, said brackets having resilient portions, whereby said brackets resiliently support said elongated guides.

8. An apparatus for transferring bobbins as set forth in claim 1, wherein said grooved belt guide means constitute at least one elongated stationary member along the length of which and relative to which said transmission belt slides.

9. An apparatus for transferring bobbins as set forth in claim 8, wherein said at least one elongated belt guide comprises an elastic material.

10. In an apparatus for transferring bobbins mounted on peg trays by means of an endless transmission belt trained about and driven by guide pulleys in a required passage, the improvement comprising two elongated guides slidably contacting said peg trays and elastically embracing said peg trays between the elongated guides and said endless transmission belt, grooved belt guide means by which said transmission belt is guided, said two elongated guides being twisted at required positions to twist a passageway of said peg trays formed by the transmission belt and the elongated guides, and a conveyor frame for said endless transmission belt provided on both sides with guide brackets supporting said elongated guides at ends thereof, respectively, said endless transmission belt being supported by two stationary belt guides made of an elastic material and having leaf springlike projections extending toward and in opposition to each other and resiliently supporting the endless transmission belt.

11. In an apparatus for transferring bobbins mounted on peg trays by means of an endless transmission belt trained about and driven by guide pulleys in a required passage, the improvement comprising two elongated guides slidably contacting said peg trays and elastically embracing said peg trays between the elongated guides and said endless transmission belt, grooved belt guide means by which said transmission belt is guided, said two elongated guides being twisted at required positions to twist a passageway of said peg trays formed by the transmission belt and the elongated guides, and a conveyor frame for said endless transmission belt which is provided with a C-shaped channel frame made of an elastic material, which supports at opened edges said elongated guides and is formed in side surfaces with shallow grooves to give resilient property to the C-shaped channel frame.

* * * * *